Patented July 7, 1931

1,813,726

UNITED STATES PATENT OFFICE

DONALD B. BRADNER, OF HAMILTON, OHIO, ASSIGNOR TO E. I. DU PONT DE NEMOURS & COMPANY, OF WILMINGTON, DELAWARE, A CORPORATION OF DELAWARE

ETHYLATION OF CELLULOSE

No Drawing.    Application filed August 10, 1927.    Serial No. 212,137.

This invention relates to an improvement in the manufacture of cellulose ethers, and more particularly to the addition of a potassium salt to the ethylation mixture.

In the manufacture of cellulose ethers, alkali cellulose is treated with an alkyl ester of an inorganic acid (i. e., ethyl chloride). The presence of some water appears to be necessary to induce reaction between cellulose and its etherifying agents. This water, however, in addition to bringing about the etherification, causes a large portion of the inorganic ester to be lost due to hydrolysis to the corresponding alcohol.

The procedures for the manufacture of cellulose ethers involve agitating and heating a mixture of cellulose, alkali, water and inorganic ester for several hours at a relatively high temperature. This length of time is necessary to obtain products which dissolve completely in common organic solvents. Shorter periods of etherification give products which are not completely soluble, and which, therefore, have no direct technical value. The time cycle is such that less than two etherifications per day can be conducted in a single autoclave of commercial size. The tying up of equipment to this degree is expensive.

The use of very high ratios of caustic alkali to water in the etherification is necessary to obtain ethers which are completely soluble in common organic solvents and which are water-resistant. For instance, the initial strengths of caustic soda solution in the etherification mixture may vary, roughly, between 50 and 80%. It is known that strong caustic solutions at relatively high temperatures have a detrimental action on the film-forming qualities of the cellulose nucleus, whereas cellulose ethers are relatively stable toward the action of strong alkali solutions. It is desirable, therefore, to etherify the cellulose as quickly as possible to preserve its film-forming qualities.

From the foregoing statements it can be seen that any procedure which increases the rate of etherification without a corresponding increase in the rate of hydrolysis of the inorganic ester possesses the following advantages, provided such a procedure does not have a detrimental action on the cellulose.

1. Decrease in material cost, due to lower consumption of inorganic ester.
2. Decrease in operating costs, due to lower time cycle.
3. Improvement in quality of product, due to minimizing the detrimental action of alkali on cellulose.

German Patent 408342, to Ernst Teuple, covers a process for the manufacture of cellulose ethers from alkali cellulose and alkyl halides, characterized by the fact that the salt formed in the alkylation is added to the alkylation mixture at the beginning. It is maintained that the alkylation is faster in the presence of the salt. The effect of the salt is attributed to a destructive action on the cellulose fiber due to the formation of crystals within the fiber.

Investigation has shown that the addition of sodium chloride to an ethylation mixture containing cellulose, caustic soda, water and ethyl chloride does increase the rate of ethylation. This procedure probably possesses the advantages of decreasing costs and improving the quality of ethyl cellulose.

I have found that the addition of potassium chloride (a salt different from that formed in the ethylation) to an ethylation mixture containing cellulose, caustic soda, water and ethyl chloride is much more effective than sodium chloride in increasing the rate of ethylation of the cellulose. For instance, the comparative yields of product obtained after a certain interval of ethylation with and without addition of salts are as follows:

| Salt added | Yield of products from 100 g. cellulose |
|---|---|
| None | 116 |
| Sodium chloride | 126 |
| Potassium chloride | 134 |

A comparison of a standard ethylation (using a slurry of caustic soda and cellulose in benzene, water and ethyl chloride in the 25-gallon autoclave) with a similar ethylation to which potassium chloride was added shows the following advantages gained by the addition of this salt:

1. Reduction in time of ethylation by about 50%.
2. Decrease in consumption of ethyl chloride by about 20%.
3. Films obtained appear to be as good as those obtained from standard products.

These results, therefore, show that potassium chloride is much more effective than sodium chloride in increasing the rate of ethylation. Potassium sulfate or potassium carbonate may be used in place of potassium chloride. Also the chlorides of the metals of the potassium group, such as lithium, rubidium, and cæsium may be used if desired.

In order to disclose the invention in more detail the following example of an actual embodiment thereof is presented. It is to be understood, of course, that this example is furnished for illustrative purposes solely, and that it is not my intention to be limited to the proportions or ingredients therein set forth.

*Example*

10 lbs. cellulose, 10 lbs. water, 10 lbs. potassium chloride, 40 lbs. caustic soda, 50 lbs. ethyl chloride, and 87 lbs. benzene are charged into an autoclave. The mixture is agitated and heated for 5 hours at 150° C. The excess ethyl chloride and benzene, with some alcohol and ether, are removed from the reaction mixture by steam distillation. The ethyl cellulose which remains as a fine granular mass is washed thoroughly. The washing treatment may include a treatment with dilute acids. Yield—14 lbs. The product is directly utilizable for technical purposes.

In place of adding the ingredients separately to the autoclave, premixtures of them may be prepared. For instance, alkali cellulose, formed by aging cellulose in caustic alkali solution and pressing out the excess liquor, may be charged into the autoclave. The cellulose and caustic soda may be ground intimately in the presence of an inert solvent and then added to the autoclave. The potassium chloride may be ground with the cellulose and caustic soda. Any other obvious variation of adding the foregoing ingredients to the autoclave may be used. The time of heating may be varied depending on the temperature and the efficiency of mixing the reactants.

As many apparently widely different embodiments of this invention may be made without departing from the spirit thereof, it is to be understood that I do not intend to limit myself to the specific embodiments thereof except as indicated in the appended claims.

I claim:—
1. The process of producing cellulose ethers which comprises agitating and heating a mixture of cellulose, alkali, water, ethyl chloride, and a potassium salt.
2. The process of producing cellulose ethers which comprises agitating and heating a mixture of cellulose, caustic soda, water, ethyl chloride, and potassium chloride.
3. The process of producing cellulose ethers which comprises agitating and heating a mixture of cellulose, caustic soda, water, ethyl chloride, and potassium chloride for approximately 5 hours at a temperature of approximately 150° C.
4. The process of producing cellulose ethers which comprises agitating and heating a mixture of cellulose, alkali, water, ethyl chloride, and a potassium salt, together with an inert solvent.
5. The process of producing cellulose ethers which comprises agitating and heating a mixture of cellulose, caustic soda, water, ethyl chloride, and potassium chloride, together with benzene, for approximately 5 hours at a temperature of approximately 150° C.
6. In the ethylation of cellulose, the step which comprises adding potassium chloride to an ethylation mixture.

In testimony whereof I affix my signature.

DONALD B. BRADNER.